US012737219B2

(12) United States Patent
Malvankar et al.

(10) Patent No.: US 12,737,219 B2
(45) Date of Patent: Sep. 15, 2026

(54) OPTIMIZING JOB PREEMPTION USING DYNAMIC AND STATIC INFORMATION

(71) Applicant: International Business Machines Corporation, Armonk, NY (US)

(72) Inventors: Abhishek Malvankar, White Plains, NY (US); Lior Aronovich, Thornhill (CA); Alaa S. Youssef, Valhalla, NY (US); Michael Spriggs, Markham (CA)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 18/355,638

(22) Filed: Jul. 20, 2023

(65) Prior Publication Data

US 2025/0028553 A1 Jan. 23, 2025

(51) Int. Cl.
*G06F 9/46* (2006.01)
*G06F 9/48* (2006.01)
*G06F 9/50* (2006.01)

(52) U.S. Cl.
CPC .......... *G06F 9/4881* (2013.01); *G06F 9/5055* (2013.01)

(58) Field of Classification Search
CPC ............................. G06F 9/4881; G06F 9/5055
See application file for complete search history.

(56) References Cited

U.S. PATENT DOCUMENTS 7,444,316 B1 10/2008 Vengerov
8,458,712 B2 6/2013 Chan
9,176,774 B2 11/2015 Druyan et al.
9,424,078 B2 8/2016 Chakravorty
9,886,306 B2 2/2018 Hildrum
10,296,382 B2 5/2019 Alrashed
(Continued)

FOREIGN PATENT DOCUMENTS

CN 109656716 B 12/2020
KR 101770900 B1 8/2017

OTHER PUBLICATIONS

"About preemptive scheduling", IBM Corporation, Last Updated Dec. 20, 2022, 3 pages, <https://www.ibm.com/docs/en/spectrum-lsf/10.1.0?topic=scheduling-about-preemptive>.
(Continued)

*Primary Examiner* — Gregory A Kessler
(74) *Attorney, Agent, or Firm* — Monchai Chuaychoo

(57) ABSTRACT

In an approach for optimizing job preemption using a scheduling mechanism that considers dynamic and static information, a processor, responsive to a pending job being selected to be run, determines that no computing hosts within a computing cluster have available resources capable of running the pending job and non-preemptive measures will not provide required resources for the pending job. A processor identifies candidate jobs for preemption and dynamic information and static information for each candidate job. A processor ranks the candidate jobs for preemption based on the dynamic information and the static information for each candidate job. A processor attempts to preempt a top N candidate jobs whose released resources in combination with the available resources of the computing cluster satisfy the required resources of the pending job. A processor, responsive to successfully preempting the top N candidate jobs, initiates the pending job.

19 Claims, 2 Drawing Sheets

(56) References Cited

U.S. PATENT DOCUMENTS

| | | | | |
|---|---|---|---|---|
| 10,318,346 | B1 * | 6/2019 | Harizopoulos | G06F 3/0626 |
| 11,023,283 | B2 | 6/2021 | Turull | |
| 11,036,553 | B2 | 6/2021 | Zhang | |
| 11,150,951 | B2 | 10/2021 | Li | |
| 11,383,928 | B2 | 7/2022 | Agarwal | |
| 2007/0044102 | A1 * | 2/2007 | Casotto | G06F 9/4881<br>718/103 |
| 2013/0312006 | A1 | 11/2013 | Hardman | |
| 2020/0167197 | A1 | 5/2020 | Bahramshahry | |
| 2021/0173694 | A1 | 6/2021 | Hildebrand | |
| 2021/0294661 | A1 | 9/2021 | Turner | |
| 2022/0301095 | A1 | 9/2022 | Dagani | |
| 2022/0318052 | A1 | 10/2022 | Sivathanu | |

OTHER PUBLICATIONS

"Introduction to Determined", Determined AI, Version 0.19.112022, Printed Feb. 20, 2023, 11 pages, <https://docs.determined.ai/latest/introduction.html>.

"Kubernetes scheduler plugins—Capacity Scheduling", Github, Printed Dec. 19, 2022, 4 pages, <https://github.com/kubernetes-sigs/scheduler-plugins/blob/master/pkg/capacityscheduling/README.md>.

"Kubernetes scheduler plugins" Github, Printed Dec. 19, 2022, 5 pages, <https://github.com/kubernetes-sigs/scheduler-plugins>.

"Scheduling, Preemption and Eviction", Kubernetes, Printed Feb. 20, 2023, 44 pages, <https://kubernetes.io/docs/concepts/scheduling-eviction/_print/>.

Bertogna et al., "Optimal Selection of Preemption Points to Minimize Preemption Overhead", 2011 23rd Euromicro Conference on Real-Time Systems, ECRTS'11, Porto, Portugal, Jul. 6-8, 2011, 46 Pages.

Kaffes et al., "Shinjuku: Preemptive Scheduling usecond-scale Tail Latency", Proceedings of the 16th USENIX Symposium on Networked Systems Design and Implementation (NSDI '19), Boston, MA, USA, Feb. 26-28, 2019, 16 Pages.

Li et al., "Best-KFF: A Multi-Objective Preemptive Resource Allocation Policy for Cloud Computing Systems", Cluster Computing, vol. 25, Issue: 1, Sep. 8, 2021, 17 Pages.

Ward et al., "Optimizing Preemption-Overhead Accounting in Multiprocessor Real-Time Systems", RTNS '14: Proceedings of the 22nd International Conference on Real-Time Networks and Systems, Versailles, France, Oct. 2014, 19 Pages.

Yabuuchi et al., "Low-Latency Job Scheduling With Preemption for the Development of Deep Learning", Proceedings of the 2019 USENIX Conference on Operational Machine Learning (OpML '19), Santa Clara, CA, USA, May 20, 2019, 5 Pages.

* cited by examiner

COMPUTER 101

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

PREEMPTION OPTIMIZATION SYSTEM 126

PERIPHERAL DEVICE SET 114

UI DEVICE SET 123

STORAGE 124

IoT SENSOR SET 125

NETWORK MODULE 115

END USER DEVICE 103

WAN 102

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

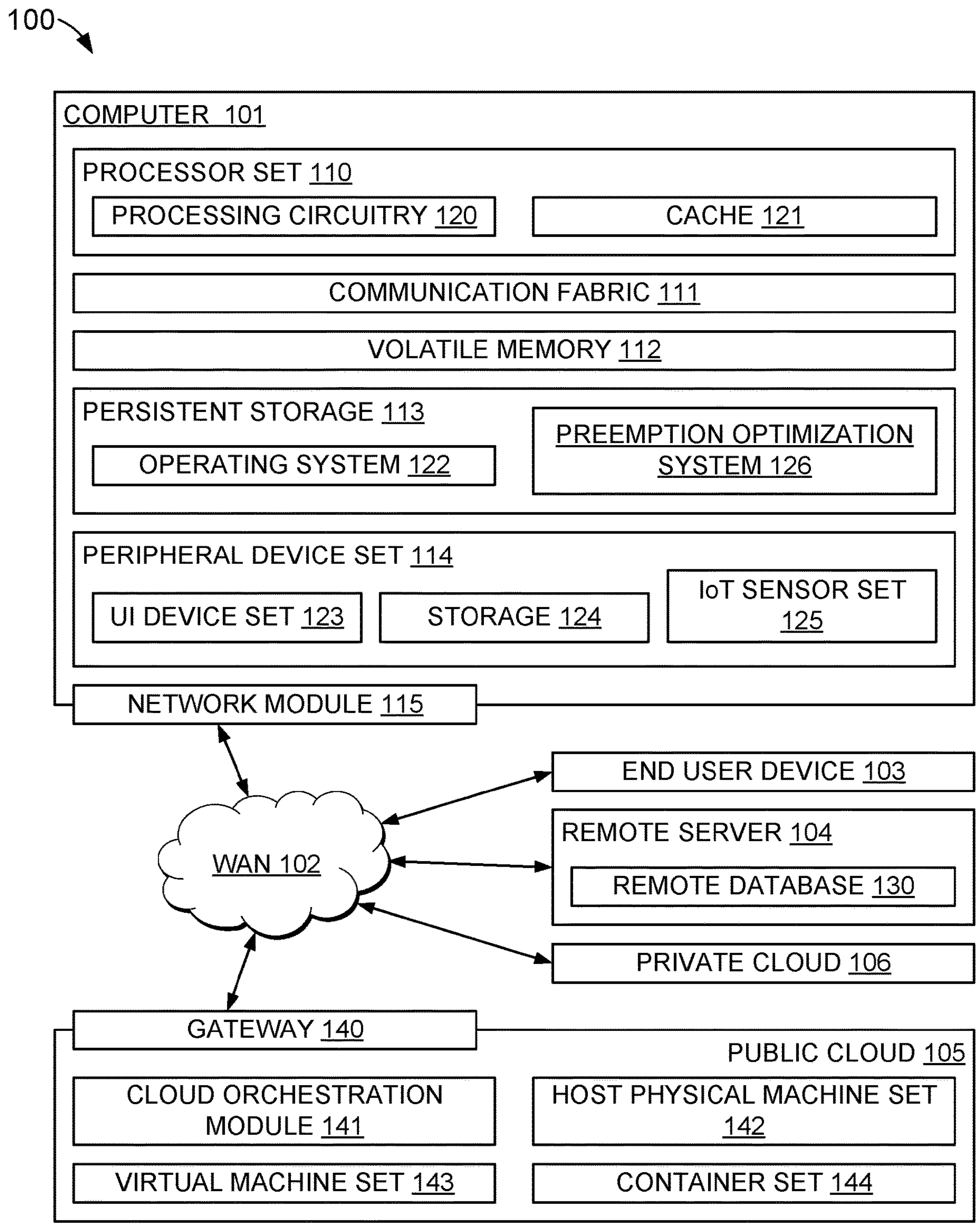

FIG. 1

OPTIMIZING JOB PREEMPTION USING DYNAMIC AND STATIC INFORMATION

BACKGROUND OF THE INVENTION

The present invention relates generally to the field of computing resource scheduling, and more particularly to a scheduling mechanism that considers dynamic and static information on processes.

In a shared computing platform, preemption can be used by schedulers in cases where demand for a resource exceeds availability. Preemption is the operation of terminating an executing process for the purpose of reusing resources that are freed by this operation by other processes, and with the intention of resuming the process that is preempted at a later time.

Schedulers select processes based on priority. Namely, for a pending process that requires resources, running processes with lower priority compared to the pending process—are considered for preemption. Existing schedulers base priorities on static values that are assigned by administrators or users. However, for processes that are computationally expensive, such as AI workloads, premature termination can cause tremendous loss of computation and resources. For example, preempting a process that used hours of computation time before its results are persisted or transmitted incurs a loss of all these computation time hours.

SUMMARY

Aspects of an embodiment of the present invention disclose a method, computer program product, and computer system for optimizing job preemption using a scheduling mechanism that considers dynamic and static information on processes to minimize loss of computation time and optimize benefit and utilization of cluster resources. A processor, responsive to a pending job being selected to be run, determines that no computing hosts within a computing cluster have available resources capable of running the pending job and non-preemptive measures will not provide required resources for the pending job. A processor identifies candidate jobs for preemption and dynamic information and static information for each candidate job, wherein the dynamic information is an elapsed time from a last checkpoint of a respective candidate job and a predicted remaining time for completion of the respective candidate job, and wherein the static information is a configured priority value assigned to the respective candidate job. A processor ranks the candidate jobs for preemption based on the dynamic information and the static information for each candidate job. A processor attempts to preempt a top N candidate jobs whose released resources in combination with the available resources of the computing cluster satisfy the required resources of the pending job. A processor, responsive to successfully preempting the top N candidate jobs, initiates the pending job.

BRIEF DESCRIPTION OF THE DRAWINGS

FIG. 1 is a functional block diagram illustrating a distributed data processing environment, for running a preemption optimization system, in accordance with an embodiment of the present invention.

DETAILED DESCRIPTION

Figure 2:
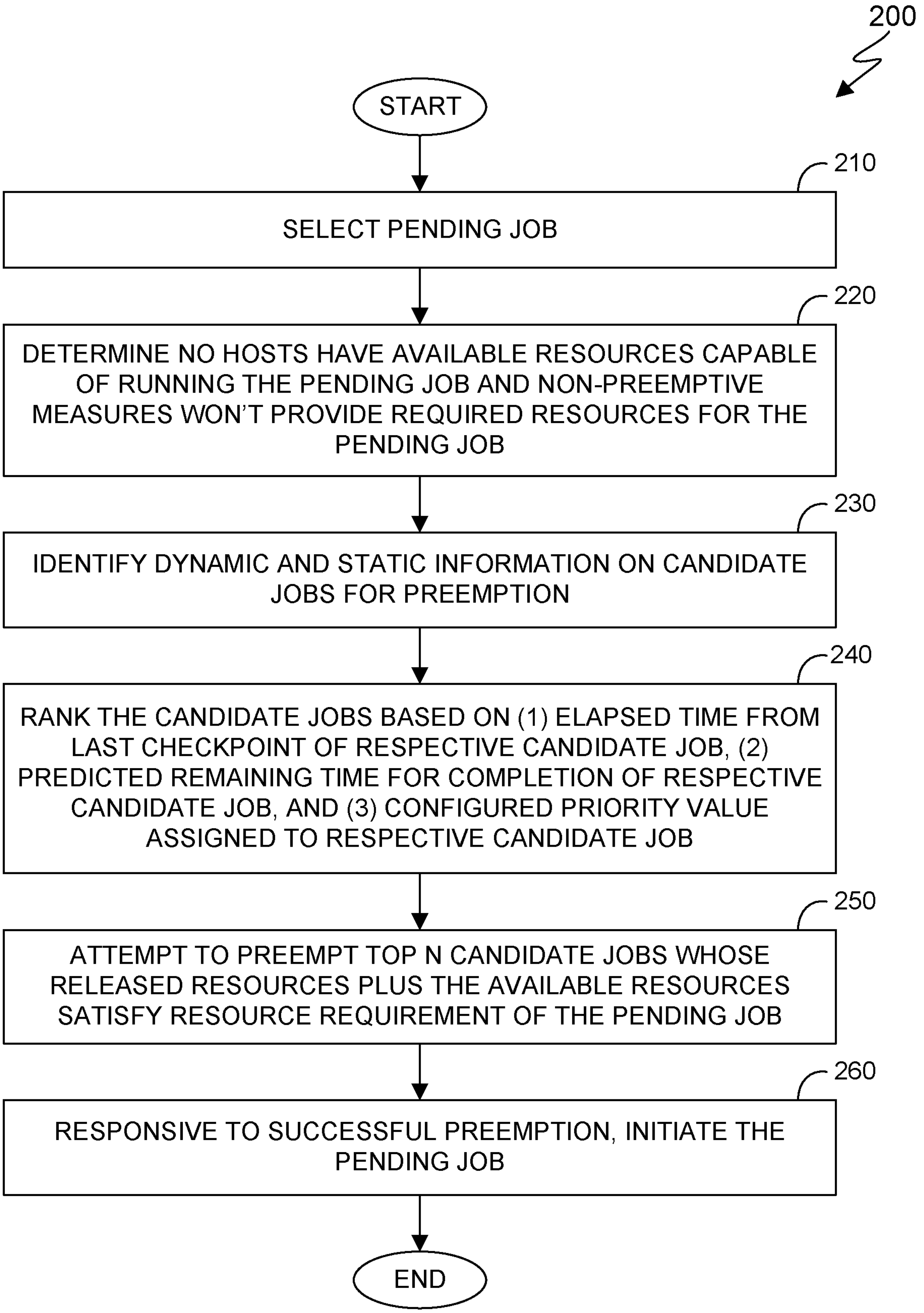
FIG. 2 is a flowchart depicting operational steps of a process of the preemption optimization system, for optimizing job preemption using a scheduling mechanism that considers dynamic and static information on processes to minimize loss of computation time and optimize benefit and utilization of cluster resources, running on a computer of the distributed data processing environment of FIG. 1, in accordance with an embodiment of the present invention.

Embodiments of the present invention recognize that schedulers of computing jobs select processes based on priority. Namely, for a pending process that requires resources, processes that are currently running with a lower priority compared to process that are pending are considered for preemption. Existing schedulers base priorities on static values that are assigned by administrators or users. However, for processes that are computationally expensive, such as AI workloads, premature termination can cause tremendous loss of computation and resources. For example, preempting a process that used hours of computation time before its results are persisted or transmitted incurs a loss of all these computation time hours.

Embodiments of the present invention recognize the need for a scheduling mechanism that considers dynamic information-along with static information-on processes considered for preemption to minimize the loss of computation time and optimize the benefit and utilization of cluster resources. There is little existing work on basing priorities for preemption on dynamic information, and none of the existing works considers the aspect of loss of computation time as a consideration for preemption calculations. This aspect is especially important for computationally expensive workloads, such as AI, finance, scientific, engineering, and many other types of workloads.

The term "preemption" as used herein can be defined as the operation of terminating an executing process for the purpose of reusing resources that are freed up by this operation to be used by other processes queued up by a scheduler to run, and with the intention of resuming the process that is preempted at a later time.

Embodiments of the present invention provide a scheduling mechanism that can be used in schedulers used in a shared computing system, a cloud environment, and a container environment.

Embodiments of the present invention provide a scheduling mechanism that (1) performs a ranking of candidate jobs for preemption by considering a combination of both static and dynamic information; (2) performs a ranking of candidate jobs for preemption with the objective of minimizing the loss of computation and optimizing the benefit and utilization of cluster resources; (3) utilizes the following metrics for ranking each candidate job for preemptions: elapsed time from the last checkpoint of a candidate job, predicted remaining time for completion for a candidate job, and configured priority value assigned to a candidate job; (4) utilizes explicit and implicit methods for calculating the elapsed time from the last checkpoint of a job metric and the predicted remaining time for completion for a job metric; and (5) utilizes methods for predicting the remaining time for completion metric for an artificial intelligence (AI) job.

Implementation of embodiments of the invention may take a variety of forms, and exemplary implementation details are discussed subsequently with reference to the Figures.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In FIG. 1, computing environment 100 contains an example of an environment for the execution of at least some of the computer code involved in performing the inventive methods, such as preemption optimization system 126. In addition to block 126, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 126, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processors set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 116 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 116 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Preemption optimization system 126 operates to optimize job preemption using a scheduling mechanism that considers dynamic and static information on processes to minimize loss of computation time and optimize benefit and utilization of cluster resources. In an embodiment, preemption optimization system 126 includes or operates alongside a job scheduler component (not shown) that operates to schedule pending jobs using resources of a computing cluster in a shared computing system or a cloud environment. A process flow of preemption optimization system 126 is depicted and described in further detail with respect to FIG. 2.

FIG. 2 is a flowchart 200 depicting operational steps of a process flow of preemption optimization system 126, for optimizing job preemption using a scheduling mechanism that considers dynamic and static information on processes to minimize loss of computation time and optimize benefit and utilization of cluster resources, running on computer 101 of computing environment 100 of FIG. 1 in accordance with an embodiment of the present invention. In an embodiment, the process flow of preemption optimization system 126 executes on a computer (e.g., computer 101 of FIG. 1), a processor (e.g., a processor of processor set 110 of FIG. 1), and/or processing circuitry (e.g., processing circuitry of processor set 110), to optimize job scheduling and preemption. It should be appreciated that the process depicted in FIG. 2 illustrates one possible iteration of the process flow of preemption optimization system 126, which can be repeated each time a new pending job is selected to run by a job scheduler of preemption optimization system 126.

In step 210, preemption optimization system 126 enables a job scheduler component to select a pending job to be run or identifies that a job scheduler component has selected a pending job to be run by one or more computing hosts within a computing cluster of a shared computing environment. In an embodiment, preemption optimization system 126 receives or identifies the pending job selected to be run by a job scheduler component and associated information about the pending job including resources required to run the pending job.

In step 220, preemption optimization system 126 determines that no computing hosts within the computing cluster have available resources capable of running the pending job and non-preemptive measures won't provide required resources for the pending job. In an embodiment, responsive to a pending job being selected to be run, preemption optimization system 126 determines whether any computing hosts within the computing cluster have available resources capable of running the pending job and/or whether non-preemptive measures are needed to release the required resources for the pending job. Non-preemptive measures include, but are not limited to, borrowing resources, horizontal downscaling, and vertical downscaling of other jobs. In an embodiment, preemption optimization system 126 makes this determination by reviewing current jobs running and the resources available in the cluster at any point in time by taking a snapshot and comparing to the associated information received about the pending job of the resources required to run the pending job.

In step 230, preemption optimization system 126 identifies dynamic and static information on candidate jobs for preemption. In an embodiment, responsive to determining that no computing hosts within the computing cluster have available resources capable of running the pending job and non-preemptive measures won't provide required resources for the pending job, preemption optimization system 126 identifies dynamic and static information on candidate jobs for preemption. In an embodiment, preemption optimization system 126 identifies the static information by pulling the static information received in a job submission script (e.g., in YAML programming language) on each candidate job for preemption. The static information is a configured priority value assigned to a candidate job. In some embodiments, preemption optimization system 126 identifies the dynamic information by polling the cluster for dynamic information about each candidate job as that job runs in the cluster. In some embodiments, preemption optimization system 126 identifies the dynamic information for each candidate job by dynamically calculating the dynamic information for each candidate job using methods described below. The dynamic information includes two aspects: (1) elapsed time from last checkpoint of a respective candidate job and (2) predicted remaining time for completion of a respective candidate job.

For calculating the elapsed time from a last checkpoint of a respective candidate job, preemption optimization system 126 can use several different methods, including implicit and explicit methods. In one embodiment, preemption optimization system 126 maintains a data structure, e.g., in a job scheduler component, that indicates (i.e., stores) the last checkpoint time (i.e., the most recent or latest checkpoint time) detected for each running job. Thus, preemption optimization system 126 calculates the elapsed time from the last checkpoint for a respective candidate job as the difference between the current time and the time recorded in the data structure for the respective candidate job. In several embodiments, preemption optimization system 126 detects the last checkpoint time in multiple ways: (1) explicitly using a scheduler application programming interface (API) by which a job marks successful completion of a checkpoint, i.e., when this API is called, the job scheduler records the time as a checkpoint for the job in the data structure; (2) implicitly by scanning a job's logs for strings or patterns that indicate completion of a checkpoint; (3) in a container environment, implicitly by monitoring volumes mounted to a container to detect changes in files that indicate completion of a checkpoint or by monitoring specific network traffic that would indicate completion of a snapshot, e.g., monitoring network traffic to an object store; and (4) for AI training jobs, implicitly by monitoring the contents of files that are specific for the AI training framework to detect completion of a checkpoint, in which most AI frameworks have specific identifiable files where calculation results are stored, progress is recorded, and stable checkpoints can be identified.

For calculating the predicted remaining time for completion of a respective candidate job, preemption optimization system 126 can use several different methods, including implicit and explicit methods. In one embodiment, preemption optimization system 126 maintains a data structure, e.g., in a job scheduler component, that indicates (i.e., stores) the predicted total time for completion for each running job and a start time of each running job. Thus, preemption optimization system 126 calculates the predicted remaining time for completion of a job using the data in the data structure as the difference between the predicted total time, the start time, and the current time. In several embodiments, preemption optimization system 126 predicts the total time or remaining time for a running job in multiple ways: (1) explicitly using a scheduler API by which a job indicates its predicted total time for completion (e.g., based on statistics); (2) implicitly by applying job profiling based on which resources are needed and which resources are available to predict the total time for completion of a job, this can be done using extrapolation or machine learning models; and (3) for AI training jobs, implicitly using information on a current training stage and future training stages to predict the remaining time for a job.

In AI framework ecosystems (e.g., TensorFlow® and Pytorch®), there are rich metrics provided including: (1) epoch that training process is currently working on, (2) percentage of training that is completed, (3) stage in which training is running, and (4) pending stages remaining. In embodiments, preemption optimization system 126 utilizes these metrics to predict the remaining time for completion of an AI job using a machine learning (ML) model that is trained on historic information of jobs (AI and non-AI jobs). In Table 1, an example set of jobs 1-4 is shown and the metrics for each, including job type (the type of model training), total epochs (number of epochs required to train the model), remaining epochs (number of epochs remaining for the training process), resources requested (amount of compute resources requested), current stage (current stage the job is working on), pending stages (stages remaining for the job to process), and predicted time (output that the ML model predicts).

TABLE 1

Examples of metrics for a set of running AI jobs

| Job Id | Job Type | Total Epochs | Remaining Epochs | Resources requested | Current Stage | Pending stages | Predicted time in minutes |
|---|---|---|---|---|---|---|---|
| 1 | RNN | 2 | 1 | 1 CPU, 1 GPU, 10GB mem | Train | Test, checkpoint | 12 |
| 2 | Transformers | 4 | 3 | 1 CPU, 4 GPU, 10GB mem | Pretrain | Fine tune, Test, checkpoint | 300 |
| 3 | CNN | 3 | 3 | 1 CPU, 10GB mem | Checkpoint | None | 5 |
| 4 | LLM | 4 | 4 | 2 CPU, 4 GPU, 32GB mem | Data loading | Train, Fine tune, Test, Checkpoint | 200 |

In step 240, preemption optimization system 126 ranks the candidate jobs based on the dynamic and static information. In an embodiment, responsive to identifying the dynamic and static information for each candidate job, preemption optimization system 126 ranks the candidate jobs. In an embodiment, preemption optimization system 126 ranks the candidate jobs based on the dynamic and static information with the objective of minimizing loss of computation (i.e., computation time of candidate jobs for preemption) in addition to optimizing the benefit and utilization of the cluster resources.

For the first dynamic aspect-elapsed time from last checkpoint of a candidate job, a first candidate job is more preferred for preemption compared with a second candidate job if the elapsed time since the first candidate job generated a persistent checkpoint is smaller than the elapsed time since the second candidate job generated a persistent checkpoint. In other words, the non-persisted computation (measured in time) that will be lost and require repetition from terminating the first candidate job is smaller than the non-persisted computation that will be lost are require repetition from terminating the second candidate job.

For the second dynamic aspect-predicted remaining time for completion of candidate job, a smaller predicted remaining time for a candidate job indicates an imminent substitution for preemption. Instead of preempting such a candidate job now and lose its computation, it is better to wait the remaining time to completion for the candidate job to terminate on its own without losing its computation. A first candidate job is more preferred for preemption compared with a second candidate job if the predicted remaining time for completion of the first candidate job is larger than the predicted remaining time for completion of the second candidate job.

For the third aspect, which is static-configured priority value assigned to a candidate job, a first candidate job is preferred for preemption compared with a second candidate job if the configured priority value assigned to the first candidate job is lower than the configured priority value assigned to the second candidate job. A configured priority value is a value pre-configured or assigned to a job in a job submission script (e.g., in YAML programming language) in which the value inversely correlates with a priority of the candidate job, i.e., lower values indicate higher priority and higher values indicate lower priority.

In an embodiment, preemption optimization system 126 utilizes a unified metric of the dynamic and static aspects used for ranking the candidate jobs. In an embodiment, preemption optimization system 126 applies the unified metric to each candidate job producing a score for each and then ranks (i.e., orders) the candidate jobs based on score from highest (best candidates for preemption) to lowest (worst candidates for preemption). In an embodiment, the unified metric is: $M(j)=W_{CD}*CD(j)+W_{LD}*LD(j)+W_{PS}*PS(j)$, where the W values are weights for each aspect function (CD, LD, and PS) of job j. The elapsed time from the last checkpoint of a candidate job aspect CD is a function (e.g., 1/log(time)) that produces a score, such that the score is higher as the elapsed time is lower. The predicted remaining time for completion of a candidate job aspect LD is a function that produces a score, such that the score is higher as the predicted remaining time is higher. The configured priority value assigned to a candidate job aspect PS is a function that produces a score that is the inverse of the configured priority value, such that the score is higher as the configured priority is higher and the configured priority value is lower.

In step 250, preemption optimization system 126 attempts to preempt a top N candidate jobs whose released resources in combination with the available resources of the cluster satisfy a resource requirement of the pending job. N is the number of candidate jobs required whose released resources in combination with the available resources of the cluster satisfy a resource requirement of the pending job. In an embodiment, responsive to ranking the candidate jobs, preemption optimization system 126 attempts to preempt a top N candidate jobs based on the ranking whose released resources in combination with the available resources of the cluster satisfy a resource requirement of the pending job. If one of the top N candidate jobs has a no-preemption policy enabled, then preemption optimization system 126 will not be able to successfully preempt that candidate job and will go to a next top candidate job to attempt to preempt until a successful preemption occurs of candidate jobs whose released resources in combination with the available resources of the cluster satisfy a resource requirement of the pending job.

In step 260, responsive to a successful preemption of the top candidate jobs, preemption optimization system 126 initiates running the pending job. Thus, preemption optimization system 126 has optimized job preemption for releasing resources within a computing cluster needed to run a pending job using a scheduling mechanism that considers dynamic and static information on processes to minimize loss of computation time and optimize benefit and utilization of cluster resources.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:

responsive to a pending job being selected to be run, determining, by one or more processors, that no computing hosts within a computing cluster have available resources capable of running the pending job and non-preemptive measures will not provide required resources for the pending job, wherein determining that no computing hosts within the computing cluster have available resources capable of running the pending job and the non-preemptive measures will not provide the required resources for the pending job comprises:

reviewing current jobs running and available resources within the computing cluster at a point in time by taking a snapshot; and comparing the available resources within the computing cluster to the required resources to run the pending job;

identifying, by the one or more processors, candidate jobs for preemption and dynamic information and static information for each candidate job, wherein the static information is a configured priority value assigned to a respective candidate job and pulled from a job submission script, wherein the dynamic information is identified by polling the computing cluster for the dynamic information about each candidate job as that candidate job runs in the computing cluster, wherein the one or more processors maintain, in a job scheduler component:

(i) a first data structure that stores, for each running job within the computing cluster, a latest checkpoint time detected for that running job, the latest checkpoint time being recorded explicitly using a scheduler application programming interface (API) by which the running job marks a successful completion of a checkpoint, and (ii) a second data structure that stores, for each running job within the computing cluster, a predicted total time for completion and a start time for that running job, wherein the dynamic information includes:

an elapsed time from a last checkpoint of a respective candidate job, calculated as a difference between a current time and the latest checkpoint time recorded in the first data structure for the respective candidate job and a predicted remaining time for completion of the respective candidate job, calculated as a difference between the predicted total time for completion recorded in the second data structure for the respective candidate job, the start time recorded in the second data structure for the respective candidate job, and the current time, wherein the predicted total time for completion is predicted implicitly by applying job profiling based on resources needed and resources available to predict a total time for completion of the respective candidate job using extrapolation or one or more machine learning models;

ranking, by the one or more processors, the candidate jobs for preemption based on the dynamic information and the static information for each candidate job, wherein ranking the candidate jobs for preemption is done with an objective of minimizing loss of computation time while optimizing a benefit and utilization of resources of the computing cluster, and wherein ranking the candidate jobs for preemption comprises utilizing a unified metric of the dynamic information and the static information for scoring each candidate job, the unified metric being:

Mj=WCD*CDj+WLD*LDj+WPS*PS(j), wherein WCD, WLD, and WPS are weights for aspect functions of candidate job j, wherein CD is a first function that produces a first score such that the first score is higher as the elapsed time from the last checkpoint is lower, wherein LD is a second function that produces a second score such that the second score is higher as the predicted remaining time is higher, and wherein PS is a third function that produces a third score such that the third score is higher as the configured priority value is lower;

attempting to preempt, by the one or more processors, a top N candidate jobs whose released resources in combination with the available resources of the computing cluster satisfy the required resources of the pending job; and responsive to successfully preempting the top N candidate jobs, initiating, by the one or more processors, the pending job.

2. The computer-implemented method of claim 1, wherein the dynamic information is an elapsed time from a last checkpoint of a respective candidate job and a predicted remaining time for completion of the respective candidate job, and wherein the static information is a configured priority value assigned to the respective candidate job.

3. The computer-implemented method of claim 1, wherein determining that no computing hosts within the computing cluster have the available resources capable of running the pending job and the non-preemptive measures will not provide the required resources for the pending job comprises:

reviewing, by the one or more processors, current jobs running and the available resources within the computing cluster at a point in time by taking a snapshot; and comparing, by the one or more processors, the available resources within the computing cluster to the required resources to run the pending job.

4. The computer-implemented method of claim 1, wherein identifying the static information for each candidate job comprises:

pulling, by the one or more processors, the static information for each candidate job from a job submission script.

5. The computer-implemented method of claim 2, wherein identifying the dynamic information for each candidate job comprises:

calculating, by the one or more processors, the elapsed time from the last checkpoint of the respective candidate job as a difference between a current time and a time of the last checkpoint recorded in a data structure for the respective candidate job, wherein the data structure stores a respective time of the last checkpoint detected for each running job within the computing cluster.

6. The computer-implemented method of claim 5, wherein the time of the last checkpoint is detected explicitly using a scheduler application programming interface (API) by which a running job marks successful completion of a checkpoint and records a time of completion of the checkpoint for the running job in the data structure.

7. The computer-implemented method of claim 5, wherein the time of the last checkpoint is detected implicitly by scanning logs of a running job for strings or patterns that indicate completion of a checkpoint.

8. The computer-implemented method of claim 5, wherein, in a container environment, the time of the last checkpoint is detected implicitly by monitoring volumes mounted to a container to detect changes in files that indicate completion of a checkpoint or by monitoring specific network traffic that would indicate completion of a snapshot.

9. The computer-implemented method of claim 5, wherein, for an artificial intelligence (AI) training job, the time of the last checkpoint is detected implicitly by monitoring contents of files that are specific for an AI training framework to detect completion of a checkpoint, wherein the AI training framework has specific identifiable files where calculation results are stored, progress is recorded, and stable checkpoints can be identified.

10. The computer-implemented method of claim 2, wherein identifying the dynamic information for each candidate job comprises:

calculating, by the one or more processors, the predicted remaining time for completion of the respective candidate job as a difference between a predicted total time for completion recorded in a data structure for the respective candidate job, a start time recorded in the data structure for the respective candidate job, and a current time, wherein the data structure stores a respective predicted total time for completion and a respective start time for each running job within the computing cluster.

11. The computer-implemented method of claim 10, wherein the predicted total time for completion is predicted explicitly using a scheduler application programming interface (API) by which a running job indicates the predicted total time for completion based on statistics.

12. The computer-implemented method of claim 10, wherein the predicted total time for completion is predicted implicitly by applying job profiling based on which resources are needed and which resources are available to predict a total time for completion of a job using extrapolation or machine learning models.

13. The computer-implemented method of claim 2, wherein identifying the dynamic information for each candidate job comprises:

predicting, by the one or more processors, the predicted remaining time for completion of the respective candidate job implicitly by using information on a current training stage and future training stages, wherein the respective candidate job is an artificial intelligence (AI) training job.

14. The computer-implemented method of claim 1, wherein ranking the candidate jobs for preemption based on the dynamic information and the static information for each candidate job is done with an objective of minimizing loss of computation time while optimizing a benefit and utilization of resources of the computer cluster.

15. A computer program product comprising:

one or more computer-readable storage media and program instructions collectively stored on the one or more computer-readable storage media, the stored program instructions comprising:

program instructions to responsive to a pending job being selected to be run, determine that no computing hosts within a computing cluster have available resources capable of running the pending job and non-preemptive measures will not provide required resources for the pending job, wherein determining that no computing hosts within the computing cluster have available resources capable of running the pending job and the non-preemptive measures will not provide the required resources for the pending job comprises:

program instructions to review current jobs running and available resources within the computing cluster at a point in time by taking a snapshot; and program instructions to compare the available resources within the computing cluster to the required resources to run the pending job;

program instructions to identify candidate jobs for preemption and dynamic information and static information for each candidate job, wherein the static information is a configured priority value assigned to a respective candidate job and pulled from a job submission script, wherein the dynamic information is identified by polling the computing cluster for the dynamic information about each candidate job as that candidate job runs in the computing cluster, wherein the one or more processors maintain, in a job scheduler component:

(i) a first data structure that stores, for each running job within the computing cluster, a latest checkpoint time detected for that running job, the latest checkpoint time being recorded explicitly using a scheduler application programming interface (API) by which the running job marks successful completion of a checkpoint, and (ii) a second data structure that stores, for each running job within the computing cluster, a predicted total time for completion and a start time for that running job, wherein the dynamic information includes:

an elapsed time from a last checkpoint of a respective candidate job, calculated as a difference between a current time and the latest checkpoint time recorded in the first data structure for the respective candidate job and a predicted remaining time for completion of the respective candidate job, calculated as a difference between the predicted total time for completion recorded in the second data structure for the respective candidate job, the start time recorded in the second data structure for the respective candidate job, and the current time, wherein the predicted total time for completion is predicted implicitly by applying job profiling based on resources needed and resources available to predict a total time for completion of the respective candidate job using extrapolation or one or more machine learning models;

program instructions to rank the candidate jobs for preemption based on the dynamic information and the static information for each candidate job, wherein ranking the candidate jobs for preemption is done with an objective of minimizing loss of computation time while optimizing a benefit and utilization of resources of the computing cluster, and wherein ranking the candidate jobs for preemption comprises utilizing a unified metric of the dynamic information and the static information for scoring each candidate job, the unified metric being:

$$Mj=WCD*CDj+WLD*LDj+WPS*PS(j),$$

wherein WCD, WLD, and WPS are weights for aspect functions of candidate job j. wherein CD is a first function that produces a first score such that the first score is higher as the elapsed time from the last checkpoint is lower, wherein LD is a second function that produces a second score such that the second score is higher as the predicted remaining time is higher, and wherein PS is a third function that produces a third score such that the third score is higher as the configured priority value is lower;

program instructions to attempt to preempt a top N candidate jobs whose released resources in combination with the available resources of the computing cluster satisfy the required resources of the pending job; and program instructions to responsive to successfully preempting the top N candidate jobs, initiate the pending job.

16. The computer program product of claim 15, wherein the dynamic information is an elapsed time from a last checkpoint of a respective candidate job and a predicted remaining time for completion of the respective candidate job, and wherein the static information is a configured priority value assigned to the respective candidate job.

17. The computer program product of claim 16, wherein the program instructions to identify the dynamic information for each candidate job comprises:

program instructions, stored on at least one of the one or more computer readable storage media, to calculate the elapsed time from the last checkpoint of the respective candidate job as a difference between a current time and a time of the last checkpoint recorded in a data structure for the respective candidate job, wherein the data structure stores a respective time of the last checkpoint detected for each running job within the computing cluster.

18. The computer program product of claim 16, wherein the program instructions to identify the dynamic information for each candidate job comprises:

program instructions, stored on at least one of the one or more computer readable storage media, to calculate the predicted remaining time for completion of the respective candidate job as a difference between a predicted total time for completion recorded in a data structure for the respective candidate job, a start time recorded in the data structure for the respective candidate job, and a current time, wherein the data structure stores a respective predicted total time for completion and a respective start time for each running job within the computing cluster.

19. A computer system comprising:

one or more computer processors;

one or more computer-readable storage media;

program instructions collectively stored on the one or more computer-readable storage media for execution by at least one of the one or more computer processors, the stored program instructions comprising:

program instructions to responsive to a pending job being selected to be run, determine that no computing hosts within a computing cluster have available resources capable of running the pending job and non-preemptive measures will not provide required resources for the pending job, wherein determining that no computing hosts within the computing cluster have available resources capable of running the pending job and the non-preemptive measures will not provide the required resources for the pending job comprises:

program instructions to review current jobs running and available resources within the computing cluster at a point in time by taking a snapshot; and program instructions to compare the available resources within the computing cluster to the required resources to run the pending job;

program instructions to identify candidate jobs for preemption and dynamic information and static information for each candidate job, wherein the static information is a configured priority value assigned to a respective candidate job and pulled from a job submission script, wherein the dynamic information is identified by polling the computing cluster for the dynamic information about each candidate job as that candidate job runs in the computing cluster, wherein the one or more processors maintain, in a job scheduler component:

(i) a first data structure that stores, for each running job within the computing cluster, a latest checkpoint time detected for that running job, the latest checkpoint time being recorded explicitly using a scheduler application programming interface (API) by which the running job marks successful completion of a checkpoint, and (ii) a second data structure that stores, for each running job within the computing cluster, a predicted total time for completion and a start time for that running job, wherein the dynamic information includes:

an elapsed time from a last checkpoint of a respective candidate job, calculated as a difference between a current time and the latest checkpoint time recorded in the first data structure for the respective candidate job and a predicted remaining time for completion of the respective candidate job, calculated as a difference between the predicted total time for completion recorded in the second data structure for the respective candidate job, the start time recorded in the second data structure for the respective candidate job, and the current time, wherein the predicted total time for completion is predicted implicitly by applying job profiling based on resources needed and resources available to predict a total time for completion of the respective candidate job using extrapolation or one or more machine learning models;

program instructions to rank the candidate jobs for preemption based on the dynamic information and the static information for each candidate job, wherein ranking the candidate jobs for preemption is done with an objective of minimizing loss of computation time while optimizing a benefit and utilization of resources of the computing cluster, and wherein ranking the candidate jobs for preemption comprises utilizing a unified metric of the dynamic information and the static information for scoring each candidate job, the unified metric being:

$$Mj=WCD*CDj+WLD*LDj+WPS*PS(j),$$

wherein WCD, WLD, and WPS are weights for aspect functions of candidate job j, wherein CD is a first function that produces a first score such that the first score is higher as the elapsed time from the last checkpoint is lower, wherein LD is a second function that produces a second score such that the second score is higher as the predicted remaining time is higher, and wherein PS is a third function that produces a third score such that the third score is higher as the configured priority value is lower;

program instructions to attempt to preempt a top N candidate jobs whose released resources in combination with the available resources of the computing cluster satisfy the required resources of the pending job; and program instructions to responsive to successfully preempting the top N candidate jobs, initiate the pending job.

* * * * *